United States Patent [19]
Ishida et al.

[11] Patent Number: 5,293,500
[45] Date of Patent: Mar. 8, 1994

[54] PARALLEL PROCESSING METHOD AND APPARATUS

[75] Inventors: Hitoshi Ishida; Shigeyuki Kazama; Minoru Shiga, all of Kanagawa, Japan

[73] Assignee: Mitsubishi Denki K.K., Tokyo, Japan

[21] Appl. No.: 76,023

[22] Filed: May 27, 1993

Related U.S. Application Data

[63] Continuation of Ser. No. 523,811, May 16, 1990, abandoned, which is a continuation-in-part of Ser. No. 478,196, Feb. 12, 1990, Pat. No. 5,226,166.

[30] Foreign Application Priority Data

| | | | |
|---|---|---|---|
| Feb. 10, 1989 | [JP] | Japan | 1-31652 |
| May 17, 1989 | [JP] | Japan | 1-123154 |
| May 17, 1989 | [JP] | Japan | 1-123155 |
| May 29, 1989 | [JP] | Japan | 1-135406 |

[51] Int. Cl.⁵ .................................................. G06F 9/38
[52] U.S. Cl. ................................ 395/375; 395/800; 364/229.2; 364/230.1; 364/231.8; 364/DIG. 1
[58] Field of Search ............... 395/375, 800; 364/200

[56] References Cited

U.S. PATENT DOCUMENTS

| | | | |
|---|---|---|---|
| 3,629,853 | 12/1971 | Newton | 395/375 |
| 4,088,462 | 2/1977 | Kanda | 395/375 |
| 4,594,655 | 6/1986 | Hao et al. | 364/200 |
| 4,626,989 | 12/1986 | Torii | 364/200 |
| 4,766,566 | 8/1988 | Chuang | 364/900 |
| 4,811,208 | 3/1989 | Myers et al. | 364/200 |
| 4,891,753 | 1/1990 | Budde et al. | 364/200 |
| 4,903,196 | 2/1990 | Pomerene et al. | 395/375 |
| 5,075,840 | 12/1991 | Grohoski et al. | 395/800 |

*Primary Examiner*—Gareth D. Shaw
*Assistant Examiner*—Dennis M. Butler
*Attorney, Agent, or Firm*—Kanesaka & Takeuchi

[57] ABSTRACT

A parallel processor is provided with a plurality of independently operable command units and a plurality of function units each connected to the command unit. A data unit, a register file, and a carry bit are shared such that the command and function units operate in parallel without any conflict. A priority scoreboard is provided to control the register file so that the command units operate independently according to the parallelism of a program, and detect and avoid a contention for a register according to the order of priority, making simultaneous execution of a plurality of commands possible, resulting in the increased process speed.

4 Claims, 13 Drawing Sheets

| COMMAND TRANSFERRED TO DU 62 | COMMAND TRANSFERRED TO DU 65 | OPERATION | |
|---|---|---|---|
| | | NO CONTENTION EXISTS. | A CONTENTION EXISTS. |
| LOAD COMMAND | LOAD COMMAND | PARALLEL | PARALLEL |
| LOAD COMMAND | STORE COMMAND | PARALLEL | SEQUENTIAL |
| STORE COMMAND | LOAD COMMAND | PARALLEL | SEQUENTIAL |
| STORE COMMAND | STORE COMMAND | PARALLEL | SEQUENTIAL |

THERE IS NO CONTENTION BETWEEN TWO DATA UNITS.

FIG. 8 B
THERE IS A CONTENTION BETWEEN TWO DATA UNITS.
(i) TWO DATA UNITS PROCESS LOAD COMMANDS.
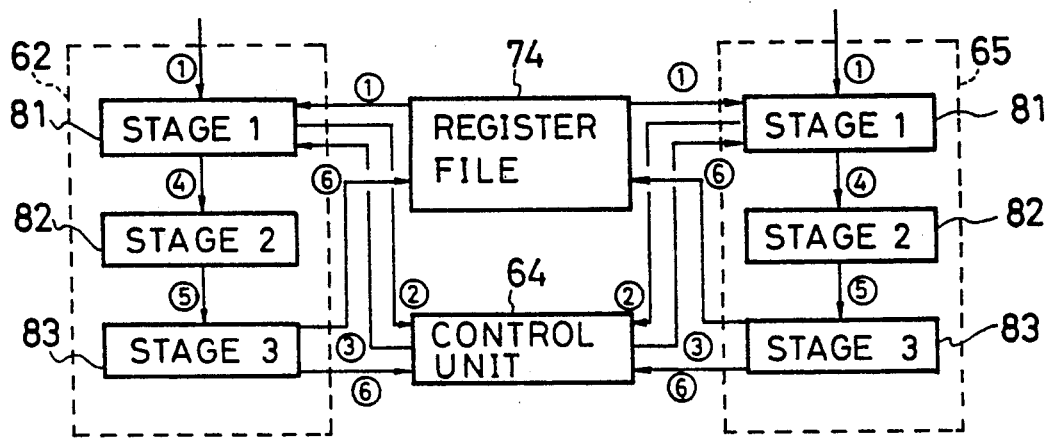
(ii) ONE OR BOTH OF DATA UNITS PROCESS STORE COMMANDS.
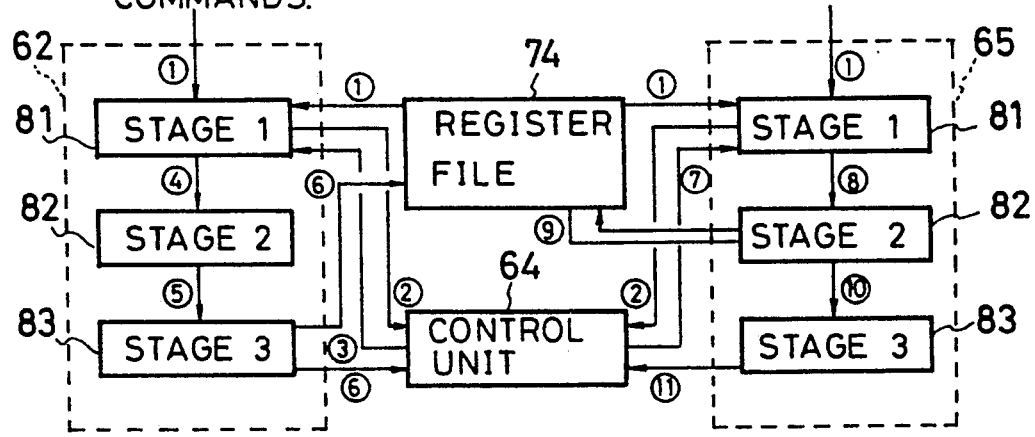

PARALLEL PROCESSING METHOD AND APPARATUS

CROSS REFERENCE TO RELATED APPLICATION

This is a continuation application Ser. No. 523,811 filed May 16, 1990, now abandoned, which is a continuation-in-part application of Ser. No. 478,196 filed Feb. 12, 1990, now Pat. No. 5,226,166.

BACKGROUND OF THE INVENTION

1. Field of the Invention

The present invention relates to parallel processing method and apparatus for use in processing information at high speeds.

2. Description of the Prior Art

A conventional parallel processor of this type, such as described by Carl Dobbs, Paul Reed, and Tommy Ng in "Supercomputing on Chip," *VLSI SYSTEMS DESIGN*, Vol. IX, No. 5, May 1988, pp. 24–33, is shown in FIG. 13. The parallel processor consists of an integer unit 501 for performing addition and subtraction of integers and a bit field process; a floating point unit 502 for multiplication of floating point numbers or integers; a floating point unit 503 for performing other floating point arithmetic operations and division of integers; an optional special function unit 504; a data unit 505 for reading and writing data in a memory; a register file 506 used by the above function units to perform an arithmetic operation; a scoreboard 507 for performing detection and avoidance of a contention for a register; a command unit 508 for fetching, decoding, and transferring a command to a function unit; a bus 509 for interconnecting the respective units to the register file; and a program counter 510 for controlling an address of the next command to be executed.

In operation, the command unit 508, which is divided into three pipelined stages; namely, fetch, decode, and transfer stages, completes a fetch in a clock cycle and passes the fetched command to the decode stage. The decode stage decodes part of the command and requests the scoreboard 507 to prefetch the necessary operand from the register file 506 for the function unit corresponding to the command. The scoreboard 507 has scoreboard bits corresponding to respective registers of the register file 506. The scoreboard bit is set while the register is installed or during data operation and is cleared when the data operation is completed. In response to a request, the scoreboard 507 checks the scoreboard bit and, if a scoreboard bit is set, waits until the scoreboard bit is cleared. Then, it issues a use permit to the command unit 508. When the operand necessary for execution of the command is fetched, the command is transferred to the function unit. Each function unit has several stages to execute the command using the prefetched operand.

In the above conventional parallel processor, however, only one command can be decoded in a clock cycle so that no more than one operation result can be obtained, resulting in the limited processing speed.

SUMMARY OF THE INVENTION

Accordingly, it is an object of the invention to provide a parallel processor which is object-interchangeable with a conventional processor and is able to simultaneously execute a plurality of commands according to the parallelism of a program at a speed higher than that of the conventional one.

According to the invention there is provided a parallel processing apparatus which includes a plurality of command units for simultaneously fetching a plurality of commands; a register file; a data unit; and a carry bit, all of which are shared by the command units; and a priority scoreboard for detecting, when parallel processing is interrupted because of data dependency or resources contention, a contention for a register between the command units and determining the order of execution based on the order of priority which has been predetermined according to the sequence of a program.

In order to operate a plurality of command units and a plurality of function units in parallel without any contradiction, the data unit, register file, and carry bit are shared, and the register file is controlled by the priority scoreboard so that the command units operate independently according to the parallelism of a program, and the priority scoreboard detects a contention for a register and avoids it making use of the order of priority, whereby a plurality of commands are executed simultaneously.

The above and other objects, features, and advantages of the invention will become more apparent from the following description when taken in conjunction with the accompanying drawings.

BRIEF DESCRIPTION OF THE DRAWINGS

FIG. 8 consisting of 8A and 8B is a block diagram useful for explaining how the control unit and the two data units of FIG. 6 work;

DESCRIPTION OF THE PREFERRED EMBODIMENT

Figure 1:
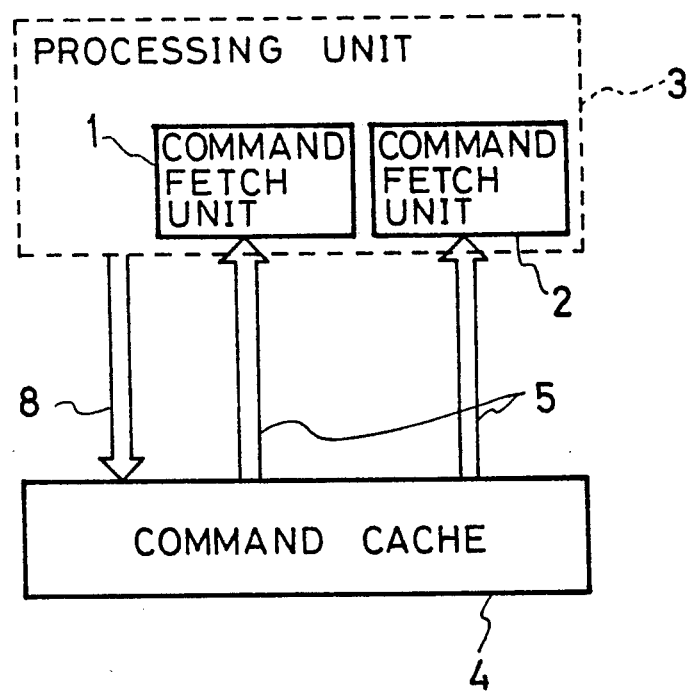
FIG. 1 is a block diagram of the essential part of a parallel processor having a pair of command fetch units according to an embodiment of the invention.

In FIG. 1, the processing unit 3 has a pair of command fetch units 1 and 2 for fetching commands simultaneously and performs either a parallel or a sequential process according to the priority given to the command fetch units 1 and 2. The command fetch unit 1 always processes a command at the address N (N=0, 1, ... ) regardless whether the command address is even or odd, while the command fetch unit 2 processes a command at the address (N+1). A command cache 4 receives the memory address N of a command to be processed in the processing unit 3 and simultaneously transfers the commands at the addresses N and (N+1) to the processing unit 3. A pair data buses 5 of 32 bits, for example, are provided to simultaneously transfer the commands at the addresses N and (N+1) for which the processing unit 3 has requested the command cache 4. An address bus 8 is used by the processing unit 3 to specify an address in the command cache 4.

In operation, when the command fetch unit 1 or 2 determines the memory address N of a command to be executed, the processing unit 3 informs the command cache 4 of the memory address N via the address bus 8. Upon reception of the memory address N, the command cache 4 compares it with the memory address therein. If there is a match, the command cache 4 simultaneously transfers the commands at the addresses N and (N+1) to the processing unit 3 via the two data buses 5. If there is no match, the command cache 4 accesses a main memory (not shown). The processing unit 3 enables the command fetch units 1 and 2 to fetch the commands at the addresses N and (N+1), respectively, and executes the two commands in either parallel or sequence according to the priority given to the commands fetch units.

Figure 2:
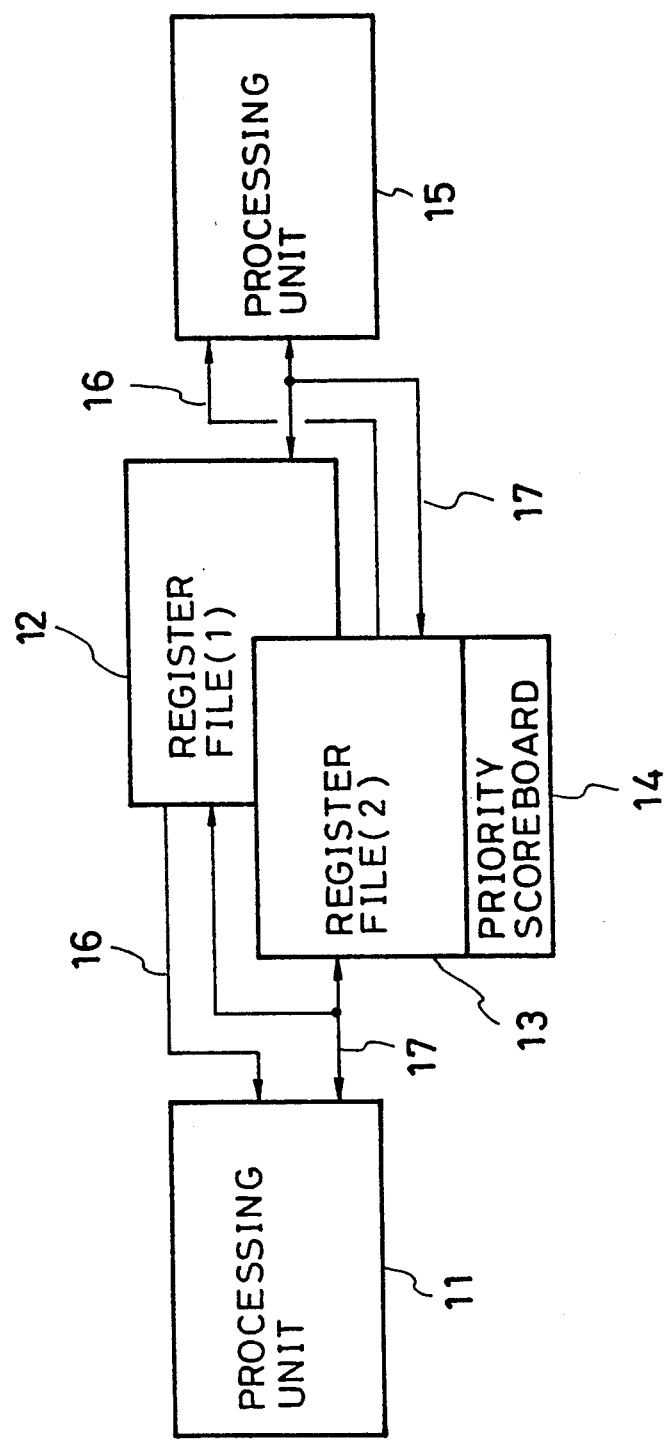
FIG. 2 is a block diagram of the essential part of a parallel processor according to another embodiment of the invention.

In FIG. 2, the parallel processor includes a processing unit 11 for fetching, decoding, executing and storing the N-th command (N=0, 1, ... ); a processing unit 15 for fetching, decoding, executing, and storing the (N+1)th command; a register file 12 for storing information for processing data corresponding to the processing unit 11; a register file 13 for storing information for processing data corresponding to the processing unit 15; a priority scoreboard 14 as a unit for detecting a register contention between the processing units 11 and 15 and adjusting the execution order for the processing units 11 and 15 according to the priority; buses 16 by which the processing units 11 and 15 read data from the register files 12 and 13, respectively; and buses 17 by which the processing units 11 and 15 write data in the register files 12 and 13.

The read bus 16 of the processing unit 11 is connected to the register file 12, while the write bus 17 is connected to both of the register files 12 and 13. The read bus 16 of the processing unit 15 is connected to the register file 13 while the write bus 17 is connected to both the register files 12 and 13.

Figure 3:
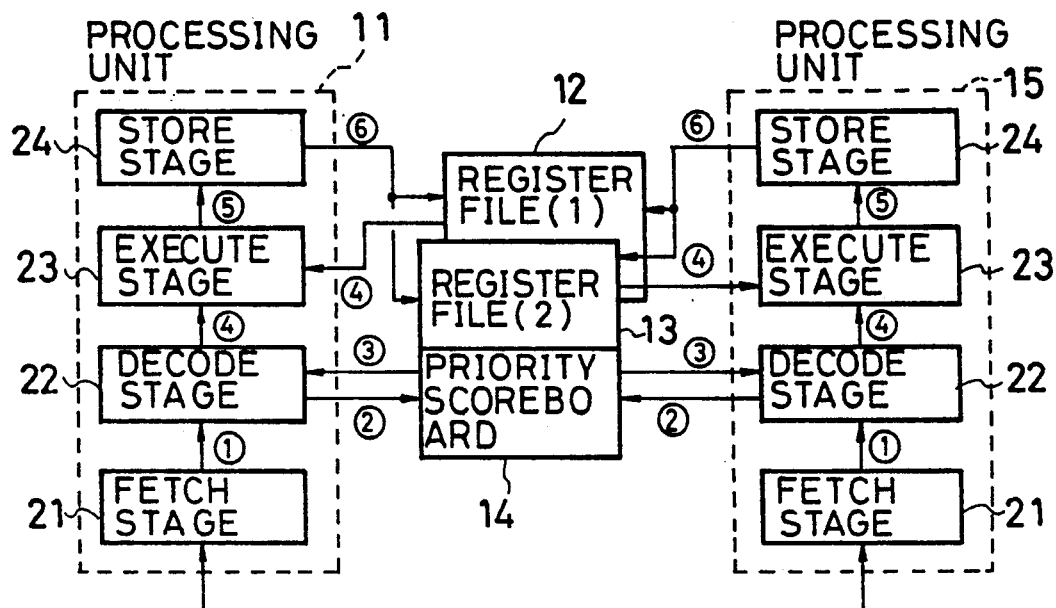
FIG. 3, consisting of 3A and 3B, is a block diagram useful for explaining the operation of a priority scoreboard of FIG. 2.
Figure 3:
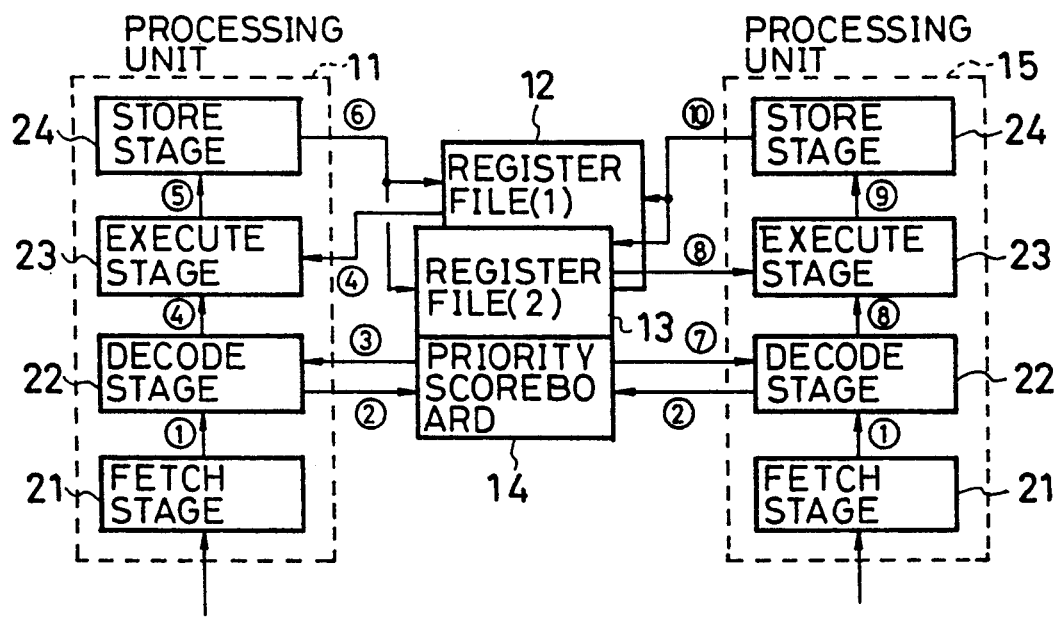

FIG. 3 shows how the priority scoreboard 14 works; FIG. 3A shows an instance where there is no contention between the two processing units, while FIG. 3B shows an instance where there is a contention. The fetch, decode, execute, and store stages 21-24 of each processing unit 11 or 15 are pipelined.

Figure 4:
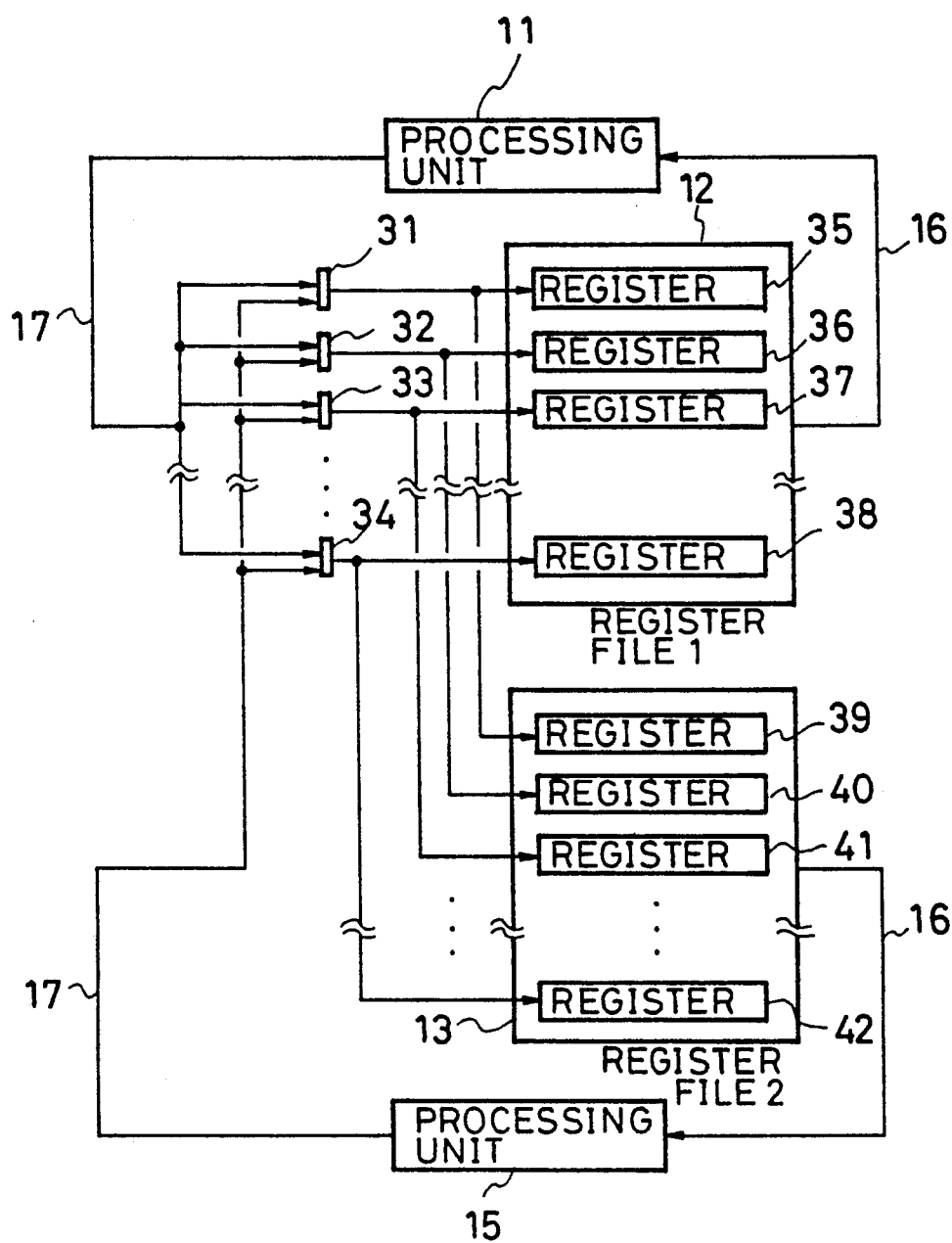
FIG. 4 is a block diagram showing the connections between processing units and selectors of FIG. 2.

In FIG. 4, selectors 31-34 are provided so that the processing units 11 and 15 simultaneously write data in two corresponding registers; one from registers 35-38 of the register file 12 and the other from registers 39-42 of the register file 13. Each selector 31-34 has its own register address corresponding to the register, and its output is connected to the corresponding register 35-38 and 39-42 in the register files 12 and 13.

Figure 5:
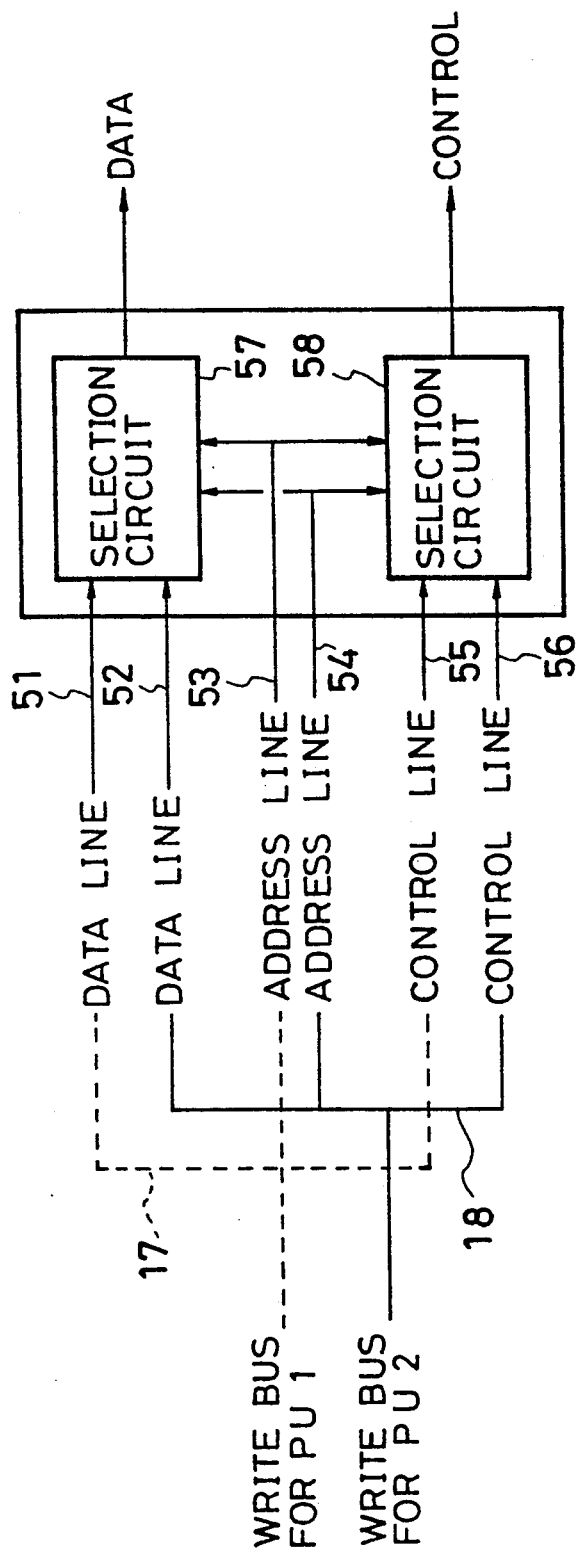
FIG. 5 is a block diagram of a selector of FIG. 2.

In FIG. 5, the bus 17 by which the processing unit (PU-1) 11 writes data in register consists of a data line 51, an address line 53, and a control line 55. Similarly, the bus 18 by which the process unit (PU-2) 15 writes data in register consists of a data line 52, an address line 54, and a control line 56. Each selection circuit 57 or 58 compares the register addresses on the address lines 53 and 54 with its own register address. If there is a match, the selection circuit selects the data and control lines corresponding to the processing unit which has issued the address.

As shown in FIG. 3, the fetch, decode, execute, and store stages 21-24 of each processing unit are pipelined. When the processing unit 15 transfers a command to the execute stage 23, the two processing units 11 and 15 simultaneously fetch and transfer commands to the decode stage 22 as indicated by (1). The command code is partially decoded in the decode stage 22 and requests the priority scoreboard 14 for the register in order to prefetch an operand necessary to execute the command as indicated by (2). The priority scoreboard 14 then checks the scoreboard bit of the requested register. If the scoreboard bit has been cleared and there is no register contention as shown in FIG. 3A, the priority scoreboard 14 issues a register available signal to both the processing units 11 and 15 as indicated by (3). Upon reception of the available signal, the two processing units 11 and 15 not only transfer the command to the execute stage 23 for execution but also prefetch an operand from the corresponding register file 12 and 13 as indicated by (4). Upon completion of the execution, the execution result is transferred to the store stage 24 as indicated by (5) and simultaneously written in all of the register files 12 and 13 as indicated by (6).

If there is a register contention between the two processing units 11 and 15 as shown in FIG. 3B, the priority scoreboard 14 issues an available signal according to the priority given to the processing units 11 or 15. In this embodiment, the processing units 11 and 15 process the N-th and (N+1)th commands, respectively, and priority is given to the processing unit 11. Consequently, the priority scoreboard 14 sends an available signal to only the processing unit 11 as indicated by (3). When the result of execution in the processing unit 11 is written in all the register files 12 and 13 in the store stage 24 as indicated by (6), the processing unit 15 receives and processes a register available signal which is sent by the priority scoreboard 14 as indicated by (7).

The read/write operation in register will be described with reference to FIGS. 4 and 5. Reading data from register is independently performed by using the read bus 17 to the processing unit which has received a register use permit from the priority scoreboard 14. The register write operation, on the other hand, the execution result to the store stage 24 and its address are put on the data line and the address line, respectively, while a timing signal for writing the execution result is put on the control line. Upon reception of the information, the selectors 31-34 compares the address sent by the address line with the register address inherent to the selector. If there is a match, the selector selects the data line and the control line corresponding to the processing unit which has issued the register address. The data line and the control line are connected to all corresponding registers of the register files 12 and 13 for performing simultaneous writing. The priority scoreboard 14 inhibits both of the processing units 11 and 15 from writing in the same register simultaneously so that the writing operations by the two processing units 11 and 15 are performed in parallel.

In this way, the priority scoreboard 14 detects and avoids any register contention between the processing units 11 and 15. Consequently, any access to the same register is eliminated, and the register read operation is performed between the register files 12 and 13 corresponding to the processing units 11 and 15. Thus, both the simultaneous writing in all the register files 12 and 13 and the parallel writing by the respective processing units 11 and 15 are implemented.

Figure 6:
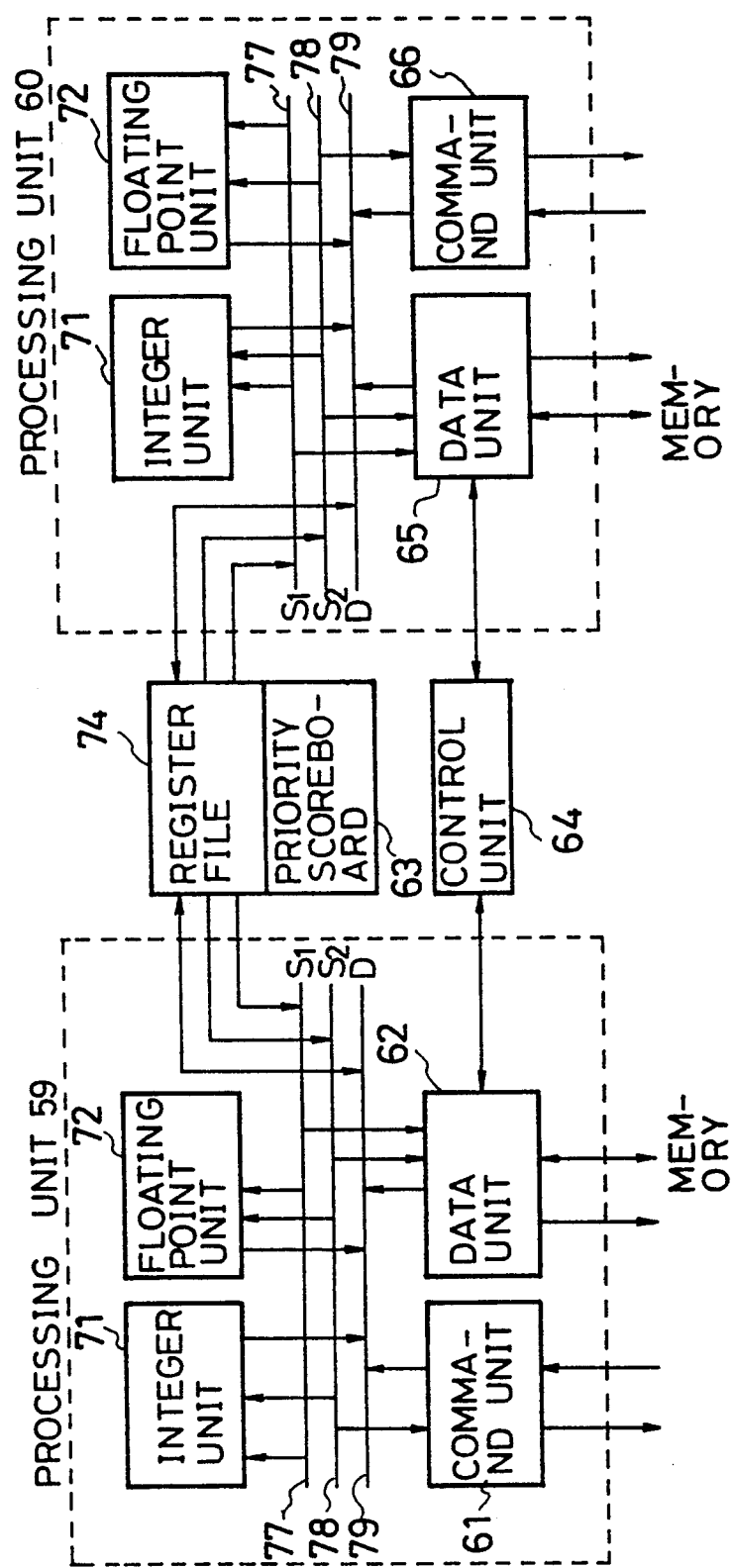
FIG. 6 is a block diagram of the essential part of a parallel processor according to still another embodiment of the invention.

In FIG. 6, the processing unit 59 includes a command unit 61 for fetching, decoding, and transferring to another function unit the N-th command (N=0 1, ...); a command unit 66 for fetching, decoding, and transferring to another function unit the (N+1)th command; a data unit 62 for receiving a load/store command from the command unit 61 for memory access; a data unit 65 for receiving a load/store command from the command unit 66 for memory access; a priority scoreboard 63 for detecting and avoiding a register contention between the two command units 61 and 66 according to the priority order; and a control unit 64 for detecting a memory address contention and determining the execution order for the data units 62 and 65 according to the priority order. The processing unit 59 includes an integer unit 71; a floating point unit 72; a command unit 61; and a data unit 62, all of which are interconnected as shown. The processing unit 60 includes an integer unit 71; a floating point unit 72; a data unit 65; and a command unit 66, all of which are interconnected as shown.

Figures 7, 8A:
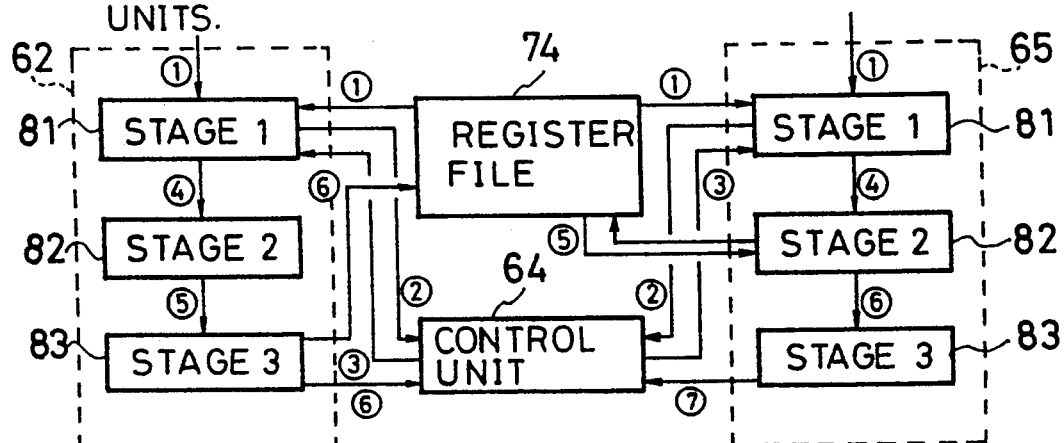
FIG. 7 is a diagram useful for explaining how the two data units of FIG. 6 work.

FIG. 7 shows how the two data units 62 and 65 change in operation according to a load/store command to be executed in each data unit (DU) 62 or 65 (1) where there is a memory address contention between the data units 62 and 65 and (2) where there is no memory address contention.

FIG. 8 shows how the control unit 64 and the two data units 62 and 65 work. FIG. 8 A shows a case where there is no memory address contention, with the data units 62 and 65 processing a load command and a store command, respectively. FIG. 8B shows a case where there is a memory address contention between the two data units 61 and 3. In FIG. 8B (i), all of the commands which cause a memory address contention are load command. In FIG. 8B (ii), at least one of the commands causing a contention is a store command, with the data units 62 and 65 processing a load command and a store command, respectively. Stages 81, 82, and 83 are provided for address computation, driving an external data address bus, and monitoring the reaction of a memory system, respectively.

The operations of the control unit 64 and the two data units 62 and 65 will be described with reference to FIG. 8. When load/store commands are transferred to the data units 62 and 65 from the command units 61 and 66 as indicated by (1), addresses are calculated in the stage 1 from the operands which have been prefetched from the register file 74 as indicated by (1). When the addresses are determined, each data unit 62 or 65 not only informs the control unit 64 of the transferred command but also requests the address calculated in the stage as indicated by (2). The control unit 64 holds all of the memory addresses and the commands (load/store) which are processed in each stage. Upon reception of the memory address request from either or both of the data units, the control unit 64 compares the memory address requested by the data unit with the memory address, including the pending memory address, which is processed in each stage of the other data unit. It is not necessary to make pending any memory address contention within the same data unit because the data units are pipelined. For example, upon reception of a request from the data unit 62, the control unit 66 compares the memory address requested by the data unit 62 with the memory address processed in each stage 1, 2, or 3 of the data unit 65 to check if there is any memory address contention. If there is no memory address contention as shown in FIG. 8A, the control unit 64 grants the data unit an execute enable as indicated by (3) in FIG. 8A, wherein both of the data units 61 and 65 access memory in parallel as indicated by (4) and (5).

There are two levels of memory address contention between the data units 61 and 65; a contention between two commands and a contention among three commands. The contentions between two commands include a contention between new commands received by the two data units 61 and 65 and a contention between a new command and a command which is being executed in the preceding stage of the other data unit. The contentions among three commands include a contention among a command under execution in the preceding stage, a pending command, and a new command and a contention among a command under execution in the preceding stage of the data unit 65 and two new commands. In any case, the control unit 64 first checks if all of the commands causing the contention are load commands. If so, it is possible to perform a parallel process so that the control unit 64 issues an execute enable to the data unit which is requesting the memory address as shown in FIG. 8B (i). Similarly to the above case where there is no memory address contention, both of the data units 62 and 65 make parallel memory accesses as indicated by (4) and (5). When the commands causing a contention contain one or more store commands, it is impossible to perform any parallel process so that the control unit 64 determines the execute order and issues an execute enable according to the priority order. In this embodiment, the descending priority order is given in the following priority table:

| Order of Priority |
| --- |
| 0 - Command under execution in the preceding stage; |
| 1 - Pending command; |
| 2 - Command accepted by the first data unit 62; and |
| 3 - Command accepted by the second data unit 65; |

For a contention between new commands accepted by the two data units 62 and 65, priority is given to the command accepted by the data unit 62 according to the above priority table. For a contention between a new command and a command under execution in the preceding stage of the other data unit, the new command is made pending until the execution in the preceding stage is completed. For a contention among a command under execution in the preceding stage, a pending command, and a new command, the highest priority is given to the command under execution, and then priority is given to the pending command. For a contention between a command under execution in the preceding stage of the data unit 65 and two new commands, the highest priority is given to the command under execution, and then priority is given to the command accepted by the data unit 62 according to the above priority table.

Upon reception of an execute enable, the data unit executes a memory access in the same way as in the conventional one. When the command execution is completed, each data unit 62 or 65 informs in the stage 3 the control unit 64 of the memory address at which the process is completed as indicated by (6) in FIG. 8A, and (6) and (11) in FIG. 8B. Upon reception of the memory addresses, the control unit 64 erases the memory addresses and commands (load/store) which have been held. Upon reception of the next memory address request, the control unit 64 checks again if there is a memory address contention and determines the execution order according to the priority order. If there is no memory address request, the control unit issues an execute enable for the pending command.

As has been described above, in the information processing system according to the above embodiment, the two processing units process commands in either parallel or sequence, the priority scoreboard detects and avoids a register contention between the processing units, the control unit detects a memory address contention between the data units and determines the execute order according to the priority order, and any memory access is executed independently as long as it is logical in the data unit corresponding to each processing unit.

Figure 9:
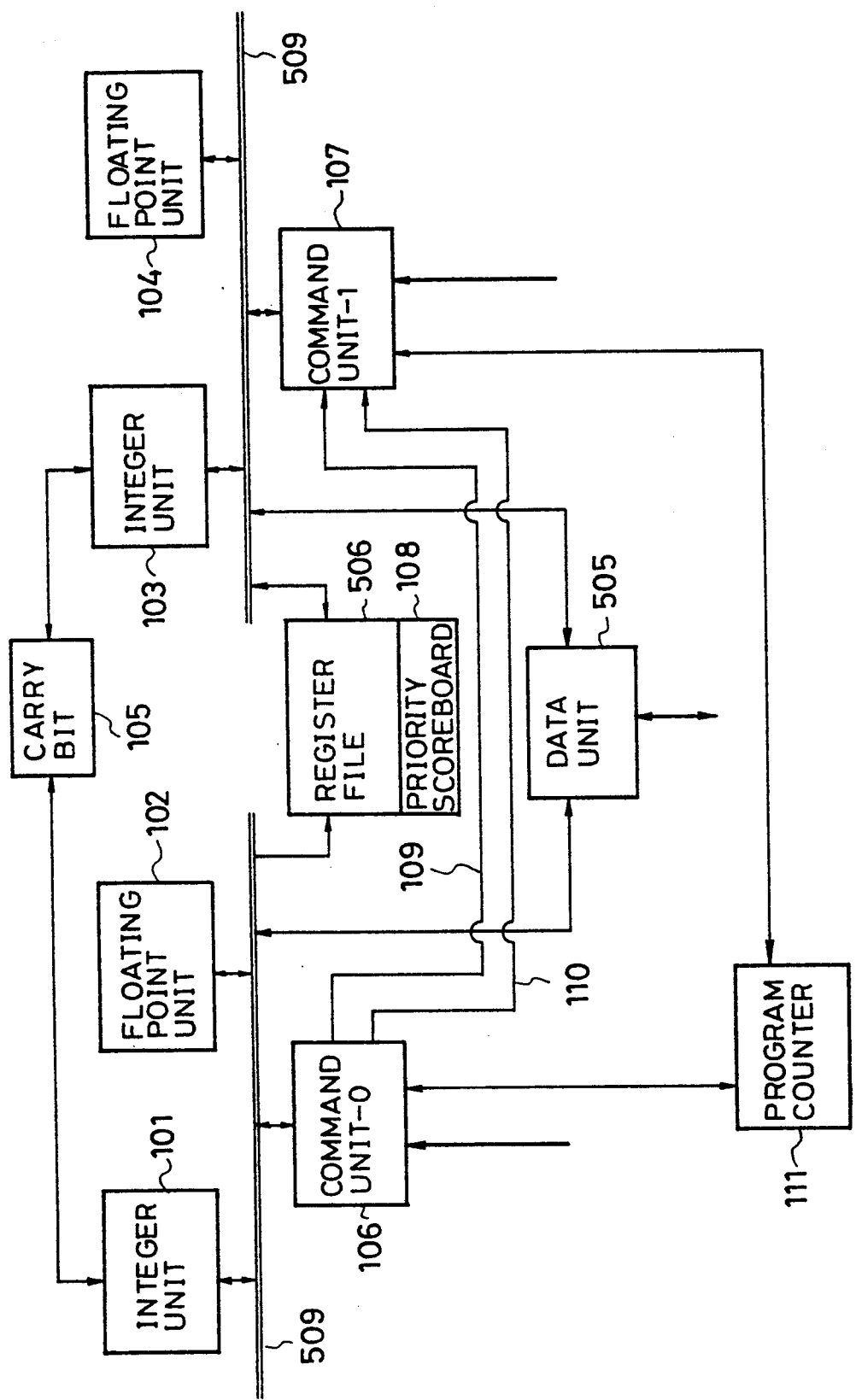
FIG. 9 is a block diagram of a parallel processor according to yet another embodiment of the invention.

In FIG. 9, the parallel processor includes a pair of integer units 101 and 103 for performing addition and subtraction of integers and logic operations; a pair of floating point units 102 and 104 for performing floating point arithmetic operations; a carry bit 105 which is common to both the integer units 101 and 103 and holds a carry; a command unit-0 106 for fetching the N-th command (N=0, 1, . . . ); a command unit-1 107 for fetching the (N+1)th command. The command unit-0 106 and unit-1 107 are connected to the integer units 101 and 103, and the floating point units 102 and 104, respectively, and the common data unit 505 and register file 506 via the bus 509.

A priority scoreboard 108 has functions of detecting a contention for the register file 506 and avoiding it according to the order of priority. Since the command unit-0 106 and the unit-1 107 fetch the N-th and (N+1)th commands, respectively, in this embodiment, the highest priority is given to the command unit-0 106 in order to maintain "priority of data" when parallel processing is interrupted. For example, if the scoreboard 108 issues a use permit to each command unit when both the command unit-0 and unit-1 simultaneously request the same register, the process would be interrupted at this point (deadlock). In addition, when the command unit-0 106 and unit-1 107 try to execute a store command and a load command, respectively, in the same memory area, priority is given to the command unit 107 so that the results having nothing to do with the store command for the command unit-0 106 are loaded. In this way, the priority scoreboard 108 plays a critical role to avoid any conflict in the program logic.

A control bus 109 is provided to transmit to the command unit-1 107 a signal for stopping, resuming, or invalidating the transfer of an command to a function unit when the command unit-0 106 fetches a branch command. A bus 110 is provided to transmit to the command unit-1 107 a signal indicating that the command unit-0 106 has transferred a command to the integer unit 101. A program counter 111 is provided to control an address of the next command to be executed.

A carry bit 105 holds a carry resulting from the computation in the integer unit 101 or 103 for reference to subsequent computation with a carry. The carry bit 105 gives priority to either the integer unit 101 or 103 in order to maintain the sequence of commands. Since the command unit-0 106 and unit-1 107 fetch the N-th and (N+1)th commands, respectively, in this embodiment, the highest priority is given to the integer unit 101. That is, when the two integer units simultaneously try to write a carry in the carry bit 105, a carry from the integer unit 101 is first written and, then, a carry from the integer unit 103 is written.

The command unit-0 106 sends to the command unit-1 107 via the bus 110 a signal indicating that the command has been transferred to the integer unit 101. The command unit-1 107 starts transfer of the command to the integer unit 103 after one clock cycle because it has a carry from the integer unit 101 only when it fetches a command with a carry. For commands without any carry, the command unit-1 107 ignores signals sent from the command unit-0 106.

Figure 10:
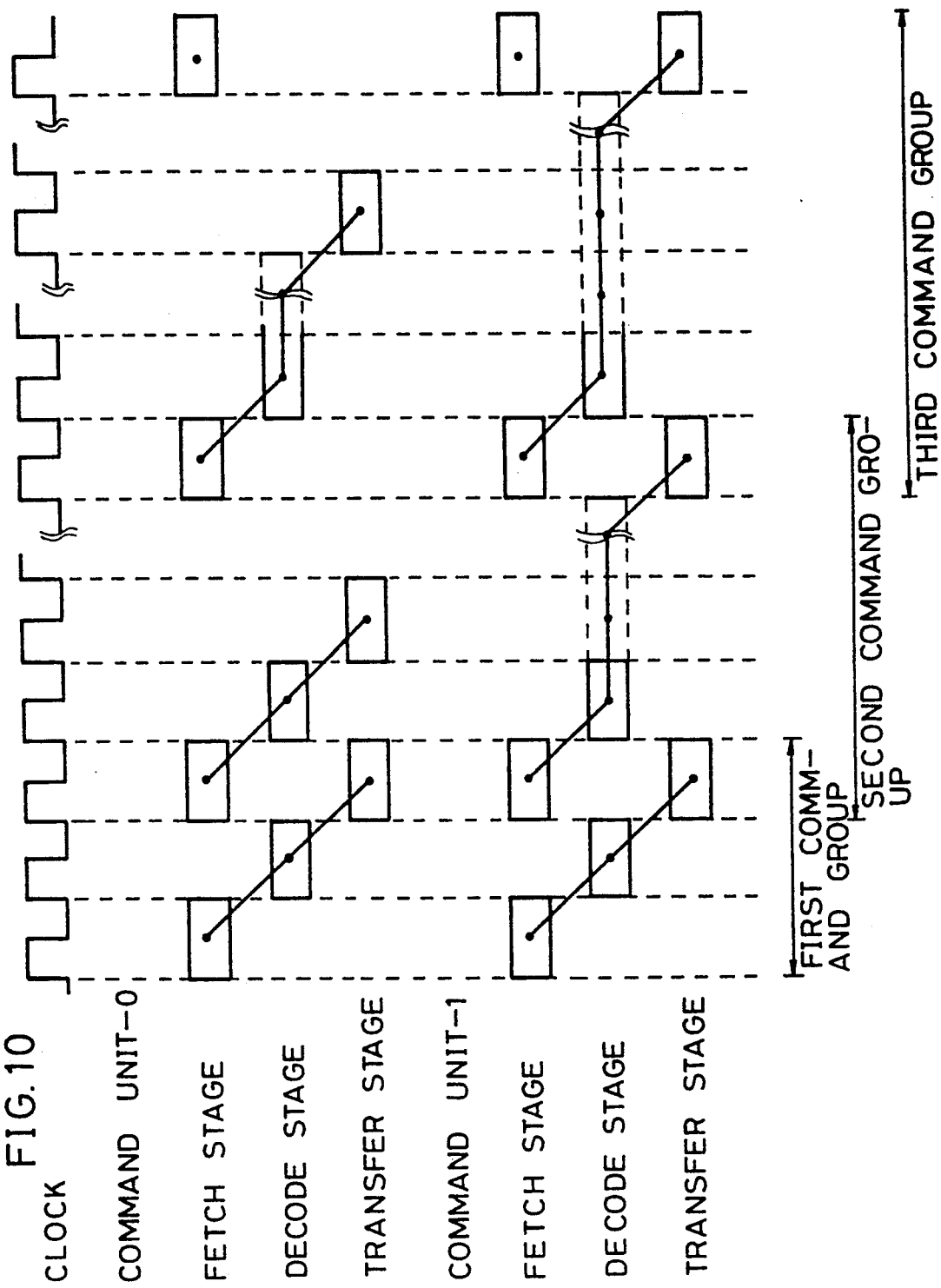
FIG. 10 is a timing chart showing the operations of the two command units of FIG. 9.

In FIG. 10, in the first command group there is no contention for any register, and the prefetch of operands has been made without difficulty. In the second command group there is a contention for a register from which the two command units try to fetch operands, and there is a delay in transfer to a function unit by the command unit-1 107. In the third command group there is not only a contention for a register between the two command units but also the operand requested by the command unit-0 106 is being used, resulting in a double delay in transfer of the command to a function unit by the command unit-1 107.

Figure 11:
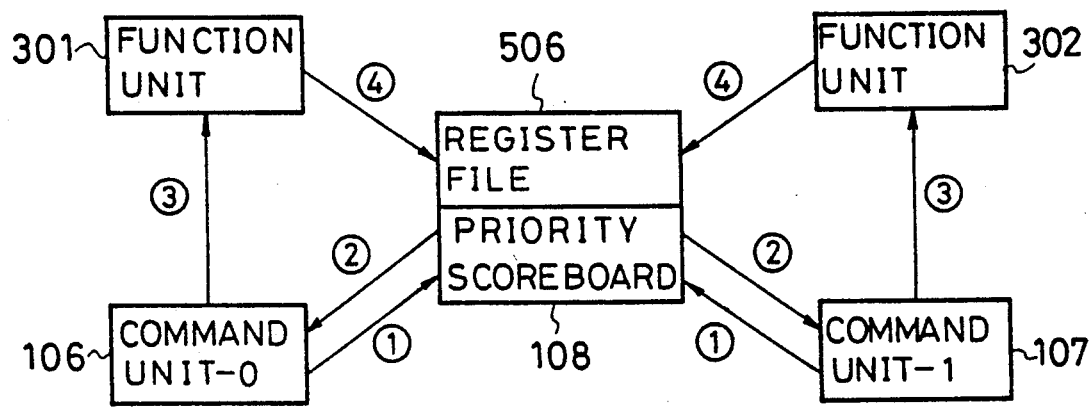
FIGS. 11A and 11B are block diagrams showing the operations of a priority scoreboard useful for the parallel processor of FIG. 9.
Figure 11:
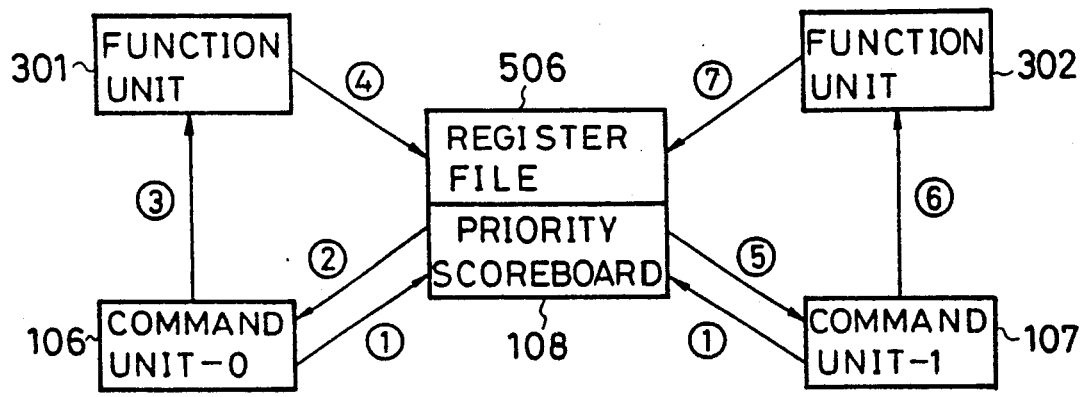

FIG. 11 shows how the priority scoreboard 108 works. FIG. 11A shows a case where no contention exists between the two command units, and FIG. 11B shows a case where a contention exists between them. Function units 301 and 302 are provided for the command unit-0 106 and unit-1 107, respectively. The priority scoreboard 108 has functions of detecting a resources contention between the commands and avoiding it according to the order of data dependency. It issues an execute enable only when the register or function unit for the command fetched by the command unit is available. However, arbitration is made for only common function units.

FIG. 12 shows branch patterns caused by various branch command fetches. FIGS. 12A and 12B show cases where a branch instruction or command is fetched in a command unit-0 106, and the branched commands are fetched by the command unit-0 106 and unit-1 107, respectively. FIGS. 12C and 12D show cases where a branch command is fetched in the command unit-1 107, and the branched commands are fetched in the command unit-0 106 and unit-1 107, respectively. The command unit-0 106 sends to the command unit-1 107 a signal for stopping, resuming, or invalidating transfer of the command via the control bus 109 as shown in FIG. 9. If the branch command is an unconditional branch command, the command unit-0 106 sends to the command unit-1 107 via the control bus 109 a signal for invalidating the command fetched in the command unit-1 107 and informs the program counter 111 of the branch address. Upon reception of the address, the program counter 111 causes the command unit-0 106 and unit-1 107 to fetch commands com 0 and com 1, respectively, as shown in FIG. 12A and 12B. In FIG. 12A, the two command units decode the commands, while in FIG. 12B, the program counter 111 sends to the command unit-0 106 a signal for invalidating the fetched command.

Figure 12A:
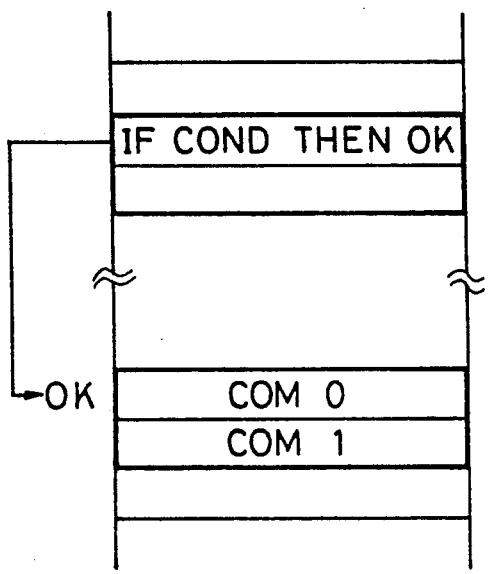
FIGS. 12A–12D shows respective branch patterns under branch instructions or commands.
Figure 12B:
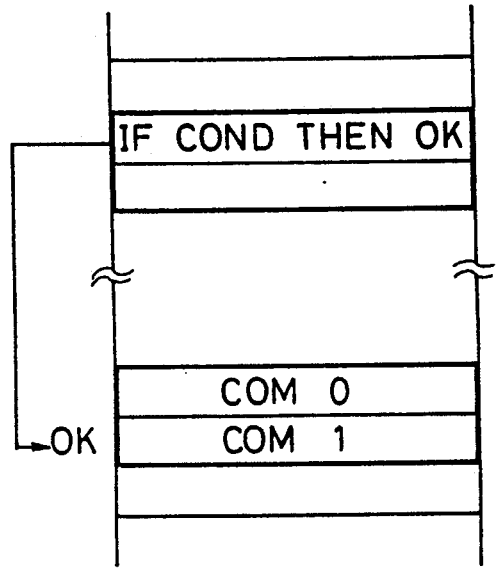
Figure 12C:
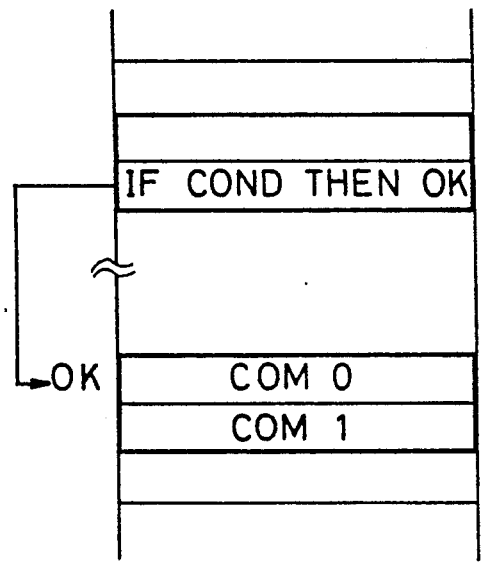
Figure 12D:
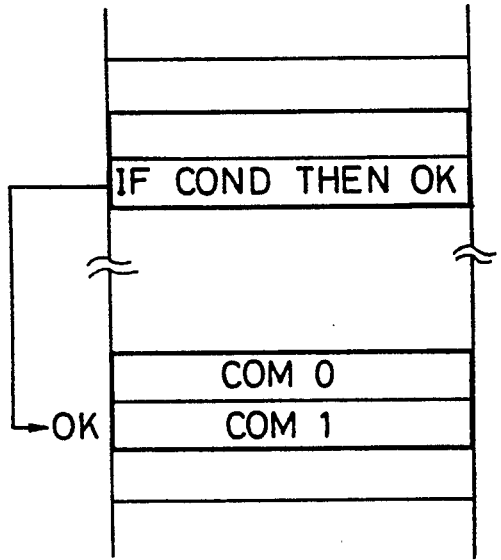
Figure 13:
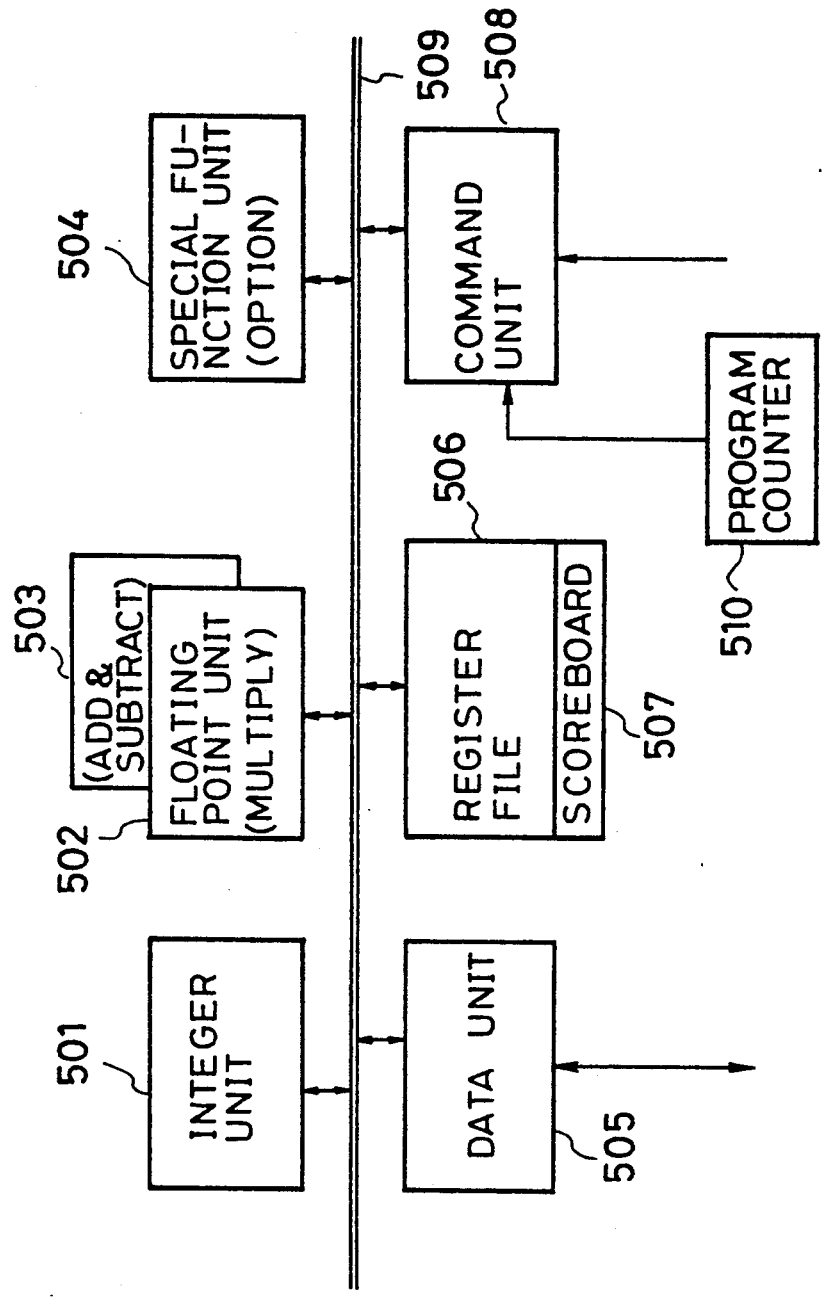
FIG. 13 is a block diagram of a conventional parallel processor.

In FIGS. 12C and 12D, upon fetch of an unconditional branch command, the command unit-1 107 informs the program counter 111 of the branch address. In the same way as in FIGS. 12A and 12B, the program counter 111 causes the command unit-0 106 and unit-1 107 to fetch commands com 0 and com 1, respectively. In FIG. 12C, the commands are processed while in FIG. 12D, a signal for invalidating the fetched command is sent to the command unit-0 106.

If the branch command is a conditional branch command, the command unit-0 106 sends to the command unit-1 107 via the control bus 109 a signal for stopping transfer of the command to a function unit. Then, if the integer unit 101 determines that the branch conditions are not satisfied, it sends to the command unit-1 107 via the control bus 109 a signal for resuming transfer of the command to the function unit. If the branch conditions are satisfied, it sends to the command unit-1 107 via the control bus 109 a signal for invalidating the command and informs the program counter 111 of the branch address. Upon reception of the branch address, the program counter 111 causes the command unit-0 106 and unit-1 107 to fetch commands com 0 and com 1, respectively.

In FIG. 12A, the two command units decode the commands, while in FIG. 12B, the program counter 111 sends to the command unit-0 106 a signal for invalidating the fetched command because com 0 is a command to be not executed. In FIGS. 12C and 12D, when the command unit-1 107 fetches a conditional branch command, the integer unit 103 makes a decision on the branch conditions. If the branch conditions are not satisfied, then the process is carried out without any branching. If the branch conditions are satisfied, the command unit-1 107 informs the program counter 111 of the branch address. Upon reception of the branch address, the program counter 111 causes the command unit-0 106 and unit-1 107 to fetch commands com 0 and com 1, respectively. In FIG. 12C, the commands are decoded, while in FIG. 12D, a signal for invalidating the fetched command is sent to the command unit-0 106.

How the priority scoreboard 108 detects a contention for a register and avoids it making use of the order of priority will be described. As shown in FIG. 10, the two command units each are divided into three pipelined stages; namely, fetch, decode, and transfer stages. The fetch of a command is synchronized with the start of a transfer to a function unit by the command unit-1 107. Both the command units fetch commands in a clock cycle and pass the fetched commands to the decode stage, respectively. Then, each command unit enables the function unit corresponding to the command to prefetch the operand necessary for performing the arithmetic operation from the register file 506. In response to the request for the operand by each command unit, the priority scoreboard 108 checks the scoreboard bit and the vacancy of the function unit to be used by the command. If the function unit to be used by the command is available, the priority scoreboard 108 sends a register available signal to the command unit-0 106 unless the scoreboard bit for the register requested by the command unit-0 106 is set. Only if the scoreboard bit for the register requested by the command unit-1 107 is not set and there is no contention for the register requested by the command unit-0 106, an available signal is sent to the command unit-1 107. Since each function unit is unable to prefetch any operand unless these conditions are satisfied, it is necessary to put any transfer to the function unit in a wait stage.

In FIG. 11A, since there is no contention for an operand between the two command units corresponding to the first command group in FIG. 10, three operations; (1) requesting an operand, (2) receiving an available signal, and (3) transferring the command to the corresponding function unit are carried out in parallel. The computation result of the function unit is written in the register (4). In FIG. 11, since there is a contention between registers for the requested operand (1) corresponding to the second command group in FIG. 10, the priority scoreboard 108 issues an available signal to only the command unit-0 106. The command unit-1 107 receives an available signal (5) after the command unit-0 106 has transferred the command to the function unit (3), and the function unit has wrote the computation result in the register (4) and started transfer of the command to the corresponding function unit (6). The function unit has several pipelined stages to execute the command using the prefetched operand and writes the result in the register.

How the data unit 505 controls the detection and avoidance of a contention will be described. When each command unit fetches a load or store command, the data unit 505 issues a request to the priority scoreboard 108 to enable the data unit 505 to prefetch the operand. The priority scoreboard 108 sends an available signal to the requesting command unit according to the conditions of register contention and vacancy of the data unit 505. The command unit, which has received an available signal from the priority scoreboard 108, transfers the command to the data unit 505.

Alternatively, the two floating point units 102 and 104 may be removed from the parallel processor of FIG. 9. With this embodiment, it is possible to achieve the maximum two commands/cycle with less hardware where there is no need for floating point arithmetic operations such as in control systems.

As has been described above, according to the invention, the parallel processor is provided with a plurality of independently operable command units and a plurality of function units each connected to the corresponding command unit and a common register file, a data unit, a carry bit, and a priority scoreboard for detecting and avoiding data dependency or contention for resources so that the command units operate independently without conflict according to the parallelism of a program, thus resulting in the increased process speed.

We claim:

1. A parallel processor for an information processing system having a plurality of processing units for performing general computer operations such as fetching, decoding, executing and storing commands, which comprises:

a plurality of register files provided for each of said processing units and each consisting of a plurality of registers for storing predetermined information;

an execution order arbiter for detecting a register contention between said processing units when a plurality of said processing units access the same register file, and adjusting an execution order for said processing units according to a predetermined priority order that a preceding command is executed before a succeeding command; and a selector for enabling independent read operations by each of said processing units from the registers of each of said register files and simultaneous write operations by each of said processing units onto the registers of all of said register files, and controlled by said execution order arbiter to enable one of said execution order when a plurality of said processing units access the register simultaneously.

2. The parallel operating data processor of claim 1, wherein said predetermined priority order is such that a higher execution priority is given to a preceding command.

3. A parallel processor for an information processing system having a plurality of command units for performing general computer operations such as fetching, decoding, and transferring commands and a plurality of processing units for processing data, said parallel processor comprising:

a register file shared by a plurality of said processing units for storing predetermined information;

register contention avoiding means for detecting a register contention between said processing units which occurs when said processing units access said register file and for avoiding said register contention according to a predetermined priority order that a preceding command is executed before a succeeding command;

data units provided for each of said processing units for executing data read/write operations between said memory and said register file; and a controller for detecting a memory address contention which occurs when said data units access said memory and determining an execution order for the access of said data units according to said predetermined priority order so that each of said command units and each of said data units process data in parallel according to said predetermined priority order when said command units issue a plurality of accesses to said register file simultaneously and when said data units issue a plurality of accesses to said memory.

4. The parallel operating data processor of claim 3, wherein said predetermined priority order is set as follows:
0- Command under execution in the preceding stage
1- Command pending
2- Command accepted by a first data unit
3- Command accepted by a second data unit.

* * * * *